United States Patent [19]
Pieh et al.

[11] Patent Number: 4,725,665
[45] Date of Patent: Feb. 16, 1988

[54] USE OF SALTS OF WATER-SOLUBLE

[75] Inventors: Stefan Pieh, Leonding; Christian Werenka, Ansfelden, both of Austria

[73] Assignee: Chemie Linz Aktiengesellschaft, Linz, Austria

[21] Appl. No.: 888,351

[22] Filed: Jul. 23, 1986

[30] Foreign Application Priority Data

Aug. 23, 1985 [DE] Fed. Rep. of Germany ....... 3530258

[51] Int. Cl.$^4$ ........................ C08G 10/02; C08G 16/02
[52] U.S. Cl. ...................................... 528/247; 528/265
[58] Field of Search ................................. 528/247, 265

[56] References Cited

U.S. PATENT DOCUMENTS

| 2,141,569 | 12/1938 | Tucker et al. | 106/90 |
| 3,277,162 | 10/1966 | Johnson | 260/505 C |
| 3,677,780 | 7/1972 | Nishi et al. | 106/90 |
| 4,125,410 | 11/1978 | Natsuume | 106/90 |
| 4,237,260 | 12/1980 | Lange et al. | 528/230 |
| 4,247,334 | 1/1981 | Falcoz et al. | 106/90 |
| 4,403,089 | 9/1983 | Buck | 528/247 |
| 4,406,702 | 9/1983 | Joseph | 106/90 |
| 4,447,266 | 5/1984 | Nachfolger | 106/90 |

FOREIGN PATENT DOCUMENTS

| 1238831 | 4/1967 | Fed. Rep. of Germany . |
| 2948698 | 12/1979 | Fed. Rep. of Germany . |
| 3143070 | 5/1983 | Fed. Rep. of Germany . |
| 3210458 | 10/1983 | Fed. Rep. of Germany . |
| 58-61115 | 4/1983 | Japan . |
| 58-96618 | 6/1983 | Japan . |
| 1286798 | 8/1972 | United Kingdom . |

OTHER PUBLICATIONS

"Kunststoffe Handbuch", vol. 1, p. 736, (1975).

Primary Examiner—Lucille M. Phynes
Attorney, Agent, or Firm—Wenderoth, Lind and Ponack

[57] ABSTRACT

Use of salts of water-soluble naphthalenesulfonic acid formaldehyde condensates having a molar formaldehyde/naphthalenesulfonic acid ratio of 1.2:1 to 3:1 and an intrinsic viscosity of 0.01 to 0.15 dl/g, as an additive to inorganic binders for improving the flowability, and a structural material prepared using binders modified in this manner.

8 Claims, No Drawings

USE OF SALTS OF WATER-SOLUBLE

The present invention relates to the use of additives based on naphthalenesulfonic acid/formaldehyde condensates for improving the properties, in particular the flowability, of inorganic binders, such as, for example, cement, anhydrite or gypsum, and the building material produced using this.

U.S. Pat. No. 2,141,569 has disclosed that the flowability of building materials based on cement can be increased by agents which have a dispersing action on the cement. If, on the other hand, the improved flowability made possible by the additive is dispensed with, an improvement in the strengths of the building materials produced with these additives over those without plasticizing additives is achieved, at constant flowability, by adding a relatively small amount of water to the cement mixture. According to this patent, concrete plasticizers of this type are obtained by condensation of aromatic sulfonic acids, such as, for example, naphthalenesulfonic acid, with formaldehyde at 95°-100° C. under atmospheric pressure, a molar ratio of formaldehyde to naphthalenesulfonic acid of 0.5-0.82 being maintained. German Auslegeschrift 1,238,831 and British patent No. 1,286,798 describe naphthalenesulfonic acid/formaldehyde condensates in the form of concrete plasticizers having a molar formaldehyde/naphthalene ratio of 1:1, which are characterized by at least a 70% content of condensates having at least 5 naphthalene nuclei, and British patent No. 1,286,798 furthermore describes the addition of a gluconate. Japanese preliminary published application No. 1983-96618 likewise describes a concrete plasticizer which is based on naphthalene/formaldehyde and is obtained by condensation at 100°-140° C. in a nitrogen atmosphere under pressures up to 30 bar. Although the molar ratio of formaldehyde to naphthalene is formally claimed as 0.8-1.2, in the specific examples a ratio of 1.0 is used. Furthermore, the good properties are supposed to be attributable to the presence of inert gas in the pressure reactor. Japanese preliminary published application No. 1983-61115 describes a molar formaldehyde/naphthalene ratio of 0.7-1.1, preferably 0.9-1.05, and points out that a molar ratio above 1.1 gives too vigorous a reaction and products possessing poor properties.

Naphthalenesulfonic acid/formaldehyde condensates which have a higher molar formaldehyde/naphthalene ratio of up to 3 but are added to the cement not to increase the flowability but, on the contrary, to reduce the water loss are described in U.S. Pat. No. 3,277,162. These so-called "water loss additives" are added to cements which are used for lining bore holes, for example in oil production. The action of the "water loss additives" is based on the fact that they are supposed to prevent loss of water from the cement mixture to the surrounding porous rock before the cement sets.

The prior art therefore clearly teaches that naphthalenesulfonic acid resins which are used as concrete plasticizers should have a ratio of formaldehyde to naphthalenesulfonic acid of not more than 1:1; higher formaldehyde values in relation to the naphthalenesulfonic acid have an adverse effect on the plasticizing action. Furthermore, these known concrete plasticizers are not sufficiently active to permit them to be used in an optimum manner since they greatly increase the content of air pores in the fresh concrete at the same time and consequently decrease the strength of the ready-prepared concrete.

It has now been found, surprisingly, that, compared with resins having the usual relatively low formaldehyde content, naphthalenesulfonic acid/formaldehyde condensates having a higher formaldehyde/naphthalenesulfonic acid ratio than 1:1 give substantially improved flowability coupled with clearly reduced air pore formation, although such resins were expected to have a reduced action. This opens up the possibility of providing plasticizers for inorganic binders based on naphthalenesulfonic acid resins which, in contrast to the known resins, permit optimum use both with and without utilization of the water-retaining effect.

The present invention accordingly relates to the use of salts of water-soluble naphthalenesulfonic acid/formaldehyde condensates, which have a molar ratio of formaldehyde to naphthalenesulfonic acid of 1.2:1 to 3:1 and are condensed to a degree of condensation which corresponds to an intrinsic viscosity of 0.01 to 0.15 dl/g, as additives for inorganic binders for increasing the flowability and, if required, the strength of the structural components produced from them. The intrinsic viscosity or the Staudinger index is defined in Kunststoff Handbuch, volume 1, page 736, published by Vieweg and Braun, Carl Hanser Verlag 1975, and is used for characterizing the molecular weight of the polycondensate. The determination was carried out according to DIN 51,562 in an Ubbelohde capillary viscometer in 1 N sodium nitrate solution at 30° C.

The essential advantage of the invention is, in particular, that the flowability of the inorganic binders is increased without air pores additionally being introduced and the strength consequently reduced. This allows, on the one hand, binder mixtures to be transported without problems, in particular through pipelines, and on the other hand makes it possible completely to fill even poorly accessible and narrow sites and to cast relatively large flat surfaces so that they are self-leveling. Another advantage of the invention is that, when the additive according to the invention is used, the flowability of the mixture required for processing is achieved with the addition of only a small amount of water, with the result that the hardened building material possesses greater strength. If, however, increased strength is not required for the specific application, a more economical building material possessing the same strength can be obtained using the additive according to the invention by saving binder and a large amount of additives. Accordingly, it is possible to obtain a binder mixture with optimum cost-effectiveness, depending on the specified requirements and on the necessary flowability and strength.

Another important advantage of the naphthalenesulfonic acid/formaldehyde resins according to the invention arises from the fact that the early strengths of binders to which such resins are added are substantially higher than those of comparable binders containing conventional plasticizers. Inorganic binders are understood as being all substances used in the building industry, such as, for example, cements, plaster binders and masonry cements, hydraulic limes, non-hydraulic limes, building plasters, anhydrite binders, magnesite binders and mixed binders (mixture of hydraulic binder with pozzolanic materials, such as, for example, pulverized fuel ash or microporous silica), which are prepared with water and with or without additives, such as, for example, sand of different particle sizes, and with or without further additives, and, after hardening, give a stable structural component or a stable bond between prefabricated structural components.

When the invention is used in practice, naphthalenesulfonic acid/formaldehyde resins having a molar formaldehyde/naphthalenesulfonic acid ratio of 1.3:1 to 3.0:1 are preferably employed since these give optimum results with regard to plasticizing and strength.

Preferably used naphthalenesulfonic acid/formaldehyde resins are those which are condensed up to a degree of condensation which corresponds to an intrinsic viscosity of 0.02 to 0.10 dl/g.

The naphthalenesulfonic acid/formaldehyde resins according to the invention are preferably added to the binder mixture in an amount corresponding to 0.01 to 5% by weight, based on the binder content, of the solid resin. The addition of 0.2 to 1.5% by weight is particularly preferred since in this range an excellent plasticizing effect is achieved without having to use excessively large amounts of the resin. The naphthalene/formaldehyde resin can be added to the binder mixture both in solid form and in solution.

Such naphthalenesulfonic acid/formaldehyde resins are advantageously used as plasticizers for inorganic binders, which are prepared by sulfonating naphthalene with concentrated sulfuric acid in a first reaction stage. The water formed during this procedure is removed simultaneously from the sulfonation mixture by azeotropic distillation with gasolene. Approximately molar amounts of sulfuric acid are therefore sufficient. A molar ratio of sulfuric acid to naphthalene of 0.9 to 1.1 is particularly preferred.

The naphthalenesulfonic acid formed is then condensed with excess formaldehyde, and the procedure may be carried out either under atmospheric pressure or under superatmospheric pressure, pressures of 2.5 to 11 bar being preferred. The reaction temperature is preferably 110° to 160° C. It is not necessary to establish an inert gas atmosphere in the pressure zone. After the condensation, a pH value between 7.5 and 11 is established, for example the alkali metal, alkaline earth metal or ammonium salts being formed. The resin solution obtained is either employed as such or, if required, evaporated to dryness in a spray dryer, the resin being obtained in the form of a dry powder having a maximum water content of 10%.

The present invention is illustrated in more detail with reference to the following examples:

EXAMPLE 1

Preparation of the Additive 300 g of molten 98% pure naphthalene (2.29 moles) were initially taken in a kettle equipped with a stirrer and an apparatus for the azeotropic distillation of water of reaction. 237 g of 96% strength $H_2SO_4$ were introduced in the course of 30 minutes at 120° C., while stirring. When a sulfonation temperature of 160° C. had been reached, the water of reaction formed was distilled off azeotropically with gasolene. After the total amount of water of reaction had been removed from the sulfonation mixture, the entraining agent was distilled off and the reaction mixture cooled to 120° C. After the introduction of 292 g of $H_2O$, the kettle containing the cooled sulfonic acid was closed tightly, and 233.5 g of 36% strength formalin were then introduced in the course of one hour at 120° C. and under a pressure of 1–3 bar. The total amount of formaldehyde to naphthalene corresponded to a molar ratio of 1.22:1. Thereafter, the mixture was heated to 140° C., a pressure of 4.5 bar being established, and was stirred until the degree of condensation corresponded to an intrinsic viscosity of 0.04 dl/g in 1 N $NaNO_3$ at 30° C. The pressure was then let down, and the mixture was diluted with 360 g of water and cooled to 80° C. The acidic resin was brought to pH 8.0 with about 200 g of 50% strength NaOH and discharged into containers at room temperature. The concentration of naphthalene/formaledhyde resin in the solution was 40%.

Resins having a different formaldehyde/naphthalenesulfonic acid ratio can be prepared in an analogous manner. The ratios are stated in the table below.

TABLE 1

| | Preparation of the additive | | | |
|---|---|---|---|---|
| | Formaldehyde/ | | Water (g) | |
| Example | naphthalene (mole/mole) | 36% strength formalin (g) | before the condensation | after |
| 1 | 1.22 | 233.5 | 292 | 360 |
| 2 | 1.30 | 248.8 | 280 | 364 |
| 3 | 1.50 | 287 | 273 | 380 |
| 4 | 2.00 | 383 | 239 | 405 |
| 5 | 2.50 | 477.5 | 205 | 411 |
| 6 | 3.00 | 574 | 170 | 450 |
| 7–16 | 1.50 | 287 | 273 | 380 |
| 17 | 1.22 | 233.5 | 292 | 364 |
| 18–20 | 1.50 | 287 | 273 | 380 |

Preparation of the Concrete Mixture 20.23 kg of 0–4 mm round particles,
7.95 kg of 4–8 mm round particles,
6.18 kg of 8–16 mm round particles,
9.71 kg of 16–32 mm round particles and
7.04 kg of PZ 275 H cement (Perlmooser Zementwerke, Werk Kirchbichl)

were premixed in the dry state for 30 seconds in a 65 l Eirich positive mixer, after which 2.60 kg of water were added, mixing was continued for a further 30 seconds, a further 1.20 kg of water were added and mixing was continued for a further minute. 49.3 g of the additive (as a 40% strength solution), corresponding to a content of 0.28% by weight, calculated as solid substance and based on the cement content, were then added and stirring was continued for a further minute. The water/cement ratio was 0.545, and the cement content was 300 kg/m³ of fresh concrete.

Blank Test

To compare the improved properties of the above mixture, a concrete mixture was prepared in an analogous manner but without the addition of the additive.

The following properties were measured for the resulting concrete mixtures, in accordance with DIN 1048, sheet 1:

(a) slump in cm as a measure of the flowability, measured 1 minute after completion of the mixing process, (b) compressive strength after 18 hours and after 28 days (specimen cube of 15 cm edge length) and (c) air pore content by the pressure equilibration method.

The measurement data are summarized together with those of Examples 2–6 in table 2.

EXAMPLES 2–6

The additive according to the invention was prepared in each case analogously to Example 1, except that different amounts of formalin were employed, as shown in table 1, resulting in the different molar ratios of formaldehyde to naphthalene in the finished resin, as shown in table 1. Other differences with respect to Example 1—likewise summarized in table 1—are the amounts of water added both before and after the condensation. The resin content of the aqueous solutions obtained was 40% by weight.

The preparation and testing of the concrete mixtures were likewise carried out analogously to Example 1, the resin being added in solid form, after spray-drying in Example 5.

The measurement data are summarized in table 2.

TABLE 2

Properties of the concrete
300 kg of PZ 275/m³, water/cement ratio: 0.545
0.28% of additive

| Example | Formaldehyde/naphthalene (mole/mole) | Slump (cm) | Compressive strength (MPa) 18 h | Compressive strength (MPa) 28 days | Air pores (%) |
|---|---|---|---|---|---|
| Blank test | — | 33.5 | 9.7 | 37.1 | 1.1 |
| 1 | 1.22 | 60 | 10.8 | 37.5 | 1.1 |
| 2 | 1.30 | 59 | 10.5 | 38.1 | 1.0 |
| 3 | 1.50 | 61 | 10.2 | 38.0 | 0.9 |
| 4 | 2.00 | 62 | 10.4 | 39.9 | 0.9 |
| 5 | 2.50 | 59 | 10.5 | 40.0 | 1.0 |
| 6 | 3.00 | 59 | 10.3 | 40.2 | 1.0 |

EXAMPLES 7-10

The additive according to the invention was prepared in each case analogously to Example 1, except with a molar ratio of formaldehyde to naphthalene of 1.50, the process conditions stated in table 1 being maintained. The preparation and testing of the concrete mixture were carried out analogously to Example 1, except that, instead of PZ 275, a PZ 375 from Gmundner Zementwerke H. Hatschek was employed in an amount of 420 kg/m³ of fresh concrete, the amount of additive was varied from 0.02 to 10% by weight, based on the cement content, and different water/cement ratios (W/C ratio) were used. The results of the concrete test are reproduced in table 3. The slump prior to the addition of the additive was 44 cm for a water/cement ratio of 0.475.

TABLE 3

Properties of the concrete 420 kg of PZ 375/m³

| Example | W/C ratio | Additive (%) | Slump (cm) | Compressive strength (MPa) 18 h | Compressive strength (MPa) 28 days | Air pores (%) |
|---|---|---|---|---|---|---|
| 7 | 0.475 | 0.02 | 49 | 13.5 | 45.6 | less than 0.9 |
| 8 | 0.475 | 0.05 | 54 | 17.5 | 45.9 | less than 0.9 |
| 9 | 0.34 | 5.0 | 60 | 18.2 | 55.1 | 2.0 |
| 10 | 0.34 | 10.0 | 58 | 7.0 | 50.8 | 2.4 |

EXAMPLE 11

In order to demonstrate the saving of water made possible by using the additive, and the resulting increased strength coupled with constant flowability, the following concrete mixture was prepared:
11.06 kg of PZ 275 H Portland cement
7.57 kg of 0-1 mm round particles,
18.26 kg of 1-4 mm round particles,
2.83 kg of 4-8 mm round particles,
15.61 kg of 8-16 mm round particles and
25.07 kg of 16-32 mmm round particles,
the said concrete mixture having a cement content of 300 kg/m³ of solid concrete and being prepared analogously to Example 1, except with the addition of 0.8% of the plasticizer and with a water/cement ratio of 0.436 (130.71 of water/m³ of concrete). A comparative sample having the same cement content and approximately the same strength, but without plasticizer and with a water/cement ratio of 0.533 (1601 of water/m³ of concrete), was prepared analogously.

The following material properties were obtained:

| | Water/cement ratio | Slump (cm) | Compressive strength (MPa) 18 h | Compressive strength (MPa) 28 days |
|---|---|---|---|---|
| No additive | 0.533 | 42.0 | 9.15 | 38.1 |
| 0.8% of additive | 0.436 | 42.5 | 14.40 | 44.5 |

EXAMPLE 12

In order to demonstrate the saving of cement made possible by using the additive, while achieving approximately the same strength and the same flowability, a concrete mixture having a cement content of 298 kg/m³ of solid concrete and a water/cement ratio of 0.55 (163.91 of water/m³ of solid concrete), containing 0.52% of the plasticizer and having a slump of 50 cm was prepared analogously to Example 1, but with the following mixing ratio:
11.01 kg of PZ 275 H Portland cement,
19.49 kg of 0-1 mm round particles,
4.34 kg of 1-4 mm round particles,
6.51 kg of 4-8 mm round particles,
11.89 kg of 8-16 mm round particles,
26.85 kg of 16-32 mm round particles and
6.05 kg of water.

A comparative sample without an additive was prepared analogously, an increased cement ratio of 357 kg of cement/m³ of solid concrete being established in the comparative sample in order to achieve the same final strength. To achieve the same water/cement ratio, 196.4 1 of water/m³ of solid concrete were added.

The following material properties were obtained:

| | kg of cement/m³ of concrete | Water/cement ratio | Slump (cm) | Compressive strength (MPa) 18 h | Compressive strength (MPa) 28 days |
|---|---|---|---|---|---|
| No additive | 357 | 0.55 | 50 | 9.25 | 40 |
| 0.52% of additive | 298 | 0.55 | 50 | 11.65 | 40 |

As can be seen from the table, when the additive is used a substantial increase in early strength is achieved, despite the lower cement content.

EXAMPLES 13-16

In order to demonstrate the effect of the degree of condensation of the additive on the flowability of cement mortars, additives were prepared analogously to Example 1, except that a molar ratio of formaldehyde to naphthalene of 1.50 was established and in each case condensation was carried out until the intrinsic viscosity stated in table 4 was reached. The slump as a measure of the flowability was determined in accordance with Austrian Standard B 3310 (June 1980), items 6.6.3.2 and 6.6.3.3, on a cement mortar consisting of PZ 375 Portland cement (Gmunden) and having a W/C ratio of 0.50, with the addition of 0.8% of the additive. The measured values obtained are likewise reproduced in table 4:

TABLE 4

| Example | Intrinsic viscosity (dl/g) | Slump (cm) |
| --- | --- | --- |
| 13 | 0.017 | 16 |
| 14 | 0.034 | 27.5 |
| 15 | 0.104 | 15 |
| 16 | 0.15 | 14 |

The slump of an analogous cement mortar without an additive was 13 cm.

EXAMPLE 17

45 parts of synthetic anhydrite were premixed with 55 parts of aggregate (0–4 mm round particles), 17 parts of water in which 0.45 part of potassium sulfate and 0.17 part of the additive according to Example 1 had been dissolved were added, and intensive mixing was carried out for 90 seconds, a water/anhydrite ratio of 0.377 being established.

An anhydrite mixture was prepared analogously, but without the addition of the additive, and with a water-/anhydrite ratio of 0.601 in order to achieve an analogous flowability.

The slump in cm as a measure of the flowability and the flexural tensile strength and compressive strength (4×4×16 cm prisms) were determined according to DIN 1164, sheets 5 and 7.

The following material properties were obtained:

| | Water/ anhydrite | Slump (cm) | Compressive strength (MPa) 28 days | Flexural tensile strength (MPa) 28 days |
| --- | --- | --- | --- | --- |
| No additive | 0.601 | 20 | 8.97 | 3.22 |
| 0.38% of additive | 0.377 | 20 | 37.50 | 8.26 |

EXAMPLE 18

225 g of PZ 275 Portland cement (Perlmooser Zementwerke, Kirchbirchl) having a Blaine value of 3200 cm²/g, 225 g of Microsilica ® (a super-pozzolan from Elcen, containing 85–98% of $SiO_2$ and having a surface area of 20 m²/g), 450 g of fine sand and 900 g of coarse sand (according to Austrian Standard B 3310) were premixed in the dry state, the water/binder ratio (W/B ratio) being 0.9, 405 ml of water were added and stirring was carried out for 5 minutes in a standard mortar mixer, a very stiff and crumbly cement mortar being obtained.

A cement mortar to which 5.4 g of the additive according to the invention (1.22% based on the binder) and which was very readily homogenizable was prepared analogously.

Furthermore, a cement mortar which was likewise very readily homogenizable was prepared analogously with the addition of 5.4 g of the additive but with only 215 ml of water.

The following values, measured according to Austrian Standard B 3310, show the improved flowability, or, at the same flowability, the improved strengths of the building material after 18 hours (4×4×16 cm specimens):

| | W/B ratio | Slump (cm) | 18 h (MPa) | |
| --- | --- | --- | --- | --- |
| | | | Flexural tensile strength | Compressive strength |
| No additive | 0.9 | 13.1 | 1.1 | 2.9 |
| 1.22% of additive | 0.9 | 21.2 | 1.1 | 2.1 |
| 1.22% of additive | 0.478 | 13.1 | 2.47 | 8.55 |

EXAMPLE 19

225 g of PZ 375 Portland cement (Hatschek, Gmunden), 225 g of pulverized coal ash, 450 g of fine sand, 900 g of coarse sand and 205 ml of water (W/B ratio: 0.45) were stirred in a mortar mixer analogously to Example 18 to give a homogeneous mixture. An analogous mixture was prepared with the addition of 1.8 g of the additive according to the invention (0.4%, based on the binder).

The following values for the improved flowability and for the flexural tensile strengths and compressive strengths were measured after 7 days:

| | W/B ratio | Slump (cm) | Flexural tensile strength 7 days (MPa) | Compressive strength 7 days (MPa) |
| --- | --- | --- | --- | --- |
| No additive | 0.45 | 13.5 | 4.8 | 25.7 |
| 0.4% of additive | 0.45 | 18.2 | 4.3 | 23.3 |

EXAMPLE 20

450 g of hydraulic lime (Trassit ®, Steirische Montanwerke), 450 g of fine sand and 900 g of coarse sand were mixed with 225 g of water (W/B ratio: 0.5) analogously to Example 18 to give a homogeneous mortar. A mortar mixture was prepared analogously with the addition of 1.2%, based on the lime, of the additive according to the invention.

The following improved values for slump and strengths were measured after 7 days (Austrian Standard B 3310):

| | W/B ratio | Slump (cm) | Flexural tensile strength 7 days (MPa) | Compressive strength 7 days (MPa) |
| --- | --- | --- | --- | --- |
| No additive | 0.5 | 11.5 | 0.91 | 4.9 |
| 1.2% of additive | 0.5 | 19.5 | 1.6 | 6.4 |

What we claim is:
1. A process for increasing the flowability of inorganic binders which consists essentially of adding to said binders a salt of a water-soluble naphthalenesulfonic acid/formaldehyde condensate, which has a molar ratio of formaldehyde to naphthalenesulfonic acid of 1.2:1 to 3:1 and which has been condensed to a degree of condensation which corresponds to an intrinsic viscosity of 0.01 to 0.15 dl/g.

2. The process according to claim 1, wherein the molar ratio of formaldehyde to naphthalenesulfonic acid is 1.3:1 to 3:1.

3. The process according to claim 1, wherein said degree of condensation corresponds to an intrinsic viscosity of 0.02 to 0.10 dl/g.

4. The process according to claim 1, wherein the said salts are added to the inorganic binder in an amount of 0.01 to 5% by weight, based on the binder content.

5. The process according to claim 4, wherein the said salts are added to the inorganic binder in an amount of 0.2 to 1.5% by weight, based on the binder content.

6. The process according to claim 1, wherein the said salts are prepared by sulfonation of naphthalene with concentrated sulfuric acid, using a molar ratio of sulfuric acid to naphthalene of 0.9 to 1.1, with simultaneous removal of the resulting water by azeotropic distillation with gasolene, followed by condensation of the resulting naphthalenesulfonic acid with formaldehyde at a temperature of 110° to 160° C. and under a pressure of 2.5 to 11 bar.

7. A structural material based on an inorganic binder possessing increased flowability, which contains, as a plasticizer, a water-soluble salt of a naphthalenesulfonic acid/formaldehyde resin having a molar ratio of formaldehyde to naphthalenesulfonic acid of 1.2:1 to 3:1 and a degree of condensation corresponding to an intrinsic viscosity of 0.01 to 0.15 dl/g.

8. A structural material as claimed in claim 7, wherein the content of the salt of the naphthalenesulfonic acid resin is 0.01 to 5% by weight, based on the binder content.

* * * * *